United States Patent [19]

Hardwicke et al.

[11] 3,987,124

[45] Oct. 19, 1976

[54] PROCESS FOR PRODUCTION OF POLYMERIC POLYBLENDS

[75] Inventors: Norman L. Hardwicke, Wilbraham; Raymond A. Barkhuff, Jr., Hampden, both of Mass.

[73] Assignee: Monsanto Company, St. Louis, Mo.

[22] Filed: June 17, 1975

[21] Appl. No.: 587,764

[52] U.S. Cl. .......................................... 260/880 R
[51] Int. Cl.² ........................................ C08L 9/06
[58] Field of Search .......................... 260/880 R

[56] References Cited
UNITED STATES PATENTS

| | | | |
|---|---|---|---|
| 3,428,712 | 2/1969 | Carrock | 260/880 R |
| 3,439,065 | 4/1969 | Luftglass | 260/880 R |
| 3,448,175 | 6/1969 | Doak | 260/880 R |
| 3,579,612 | 5/1971 | Lowell | 260/880 R |
| 3,644,587 | 2/1972 | Finberg | 260/880 R |

*Primary Examiner*—Paul R. Michl
*Attorney, Agent, or Firm*—Joseph S. Nelson; William J. Farrington; James C. Logomasini

[57] ABSTRACT

This invention relates to an improved process for producing polyblends wherein said process has unexpectedly high rates of polymerization wherein a polymerizable mixture of a monovinylidene aromatic monomer and a diene rubber are partially polymerized en masse through phase inversion with the partially polymerized mixture being suspended in an inert liquid and the polymerization essentially completed; the improvement comprising utilizing a particular catalyst system, in combination with, a saturated aliphatic acid containing 12 to 20 carbon atoms and a compound selected from the group consisting of hydrated salts and water in the mass and suspension polymerization steps of the process. Said catalyst system having a half life of less than one hour at 130° C., and a 10 hour half life at a temperature of 95° to 115° C.

2 Claims, No Drawings

PROCESS FOR PRODUCTION OF POLYMERIC POLYBLENDS

BACKGROUND OF THE INVENTION

As is well known, polyblends of rubber with monovinylidene aromatic hydrocarbons have significant advantages in providing compositions of desirable resistance to impact for many applications. Various processes have been suggested or utilized for the manufacture of such polyblends including emulsion, suspension and mass polymerization techniques, and combinations thereof. Although graft blends of a monovinylidene aromatic hydrocarbon and rubber prepared en masse exhibit desirable properties, this technique has a practical limitation upon the maximum degree of conversion of monomers to polymer which can be effected because of the high viscosities and accompanying power and equipment requirements, which are encountered when the reactions are carried beyond a fairly low degree of completion after phase inversion takes place. As a result, techniques have been adopted wherein the initial polymerization is carried out en masse to a point of conversion beyond phase inversion at which the viscosity levels are still of practical magnitudes, after which the resulting prepolymerization syrup is suspended in water or other inert liquid and polymerization of the monomers carried to substantial completion.

Polyblends having diene rubbers grafted with monovinylidene aromatic monomers can be prepared by mass-suspension polymerization methods as disclosed in U.S. Pat. No. 3,488,743 to Baer et al.

The polyblends of the present invention are known commercially as high impact polystyrene (HIPS). The HIPS polyblends are used commercially in large quantities in the packaging field for molded containers for foods. Such applications require low residual monomer contents in the finished polyblend to insure acceptance for food packaging. Prior art processes have used high temperatures and catalysts having longer half-lives at higher temperature to force the polymerization in suspension to substantial completion so as to realize residual unpolymerized monomer content in the final polyblend of about 0.5%.

Such processes have not been successful in both lowering the residual monomer content of the polyblend and preserving the efficiency of the rubber phase to maintain the toughness of the polyblend. The higher temperature polymerization and higher temperature catalysts crosslink the rubber excessively during the final conversion of the monomers causing the rubber to lower in swelling index and efficiency. In addition, the higher temperature systems lower the molecular weight of the rigid phase of the polyblend further sacrificing toughness. Such prior art processes have often resorted to post devolatilization, e.g., by extrusion, attempting to lower the residual monomer content of the polyblend. Here, however, physical degradation during extrusion lowered the polyblend properties needed.

A process has been developed to lower the residual monomer of the polyblends by using the catalyst system of the present invention as disclosed in the copending application of Norman L. Hardwicke, U.S. Ser. No. 494,647, filed Aug. 5, 1974. It has now been discovered unexpectedly that the polymerization rates of the aforementioned process can be greatly improved by using said catalyst system in combination with a saturated aliphatic acid and a compound selected from the group consisting of a hydrated salt and water or mixtures thereof providing an improved process for polymerizing polyblends.

SUMMARY OF THE INVENTION

It has been found that an improved mass/suspension process for polyblends having high rates of polymerization can be obtained by the practice of the present invention comprising the following steps:

a. dissolving a graftable rubbery polymer in a polymerization monomer formulation comprising at least one monovinylidene aromatic monomer to form a polymerizable mixture, b. mass polymerization with agitation said mixture to a partially polymerized mixture having a grafted, inverted and dispersed rubber phase, c. suspending said partially polymerized mixture in an inert liquid.

d. suspension polymerizing said partially polymerized mixture to higher conversions, and e. recovering the suspending polyblend from said suspension, the improvement which comprises utilizing a peroxide catalyst having a half life of less than one hour at a temperature of 130° C., and a ten hour half life at a temperature of 95° to 115° C., in combination with a saturated aliphatic acid containing 12 to 20 carbon atoms and a compound selected from the group consisting of water and hydrated salts or mixtures thereof in steps (b) and (d) wherein step (b) is carried out at a temperature of from 95° to 125° C., polymerizing said polymerizable mixture to a conversion of about 10 to 45 percent and step (d) at a temperature of from 110° to 150° C., polymerizing said partially polymerized mixture to essentially complete conversion.

The type of catalyst, the amounts used and when added along with the temperature of catalysis and polymerization have been found to be critical to the present process. Small amounts are added to the mass polymerization step to initiate polymerization of the rigid phase and obtain the right level of grafting of monomers to the substrate rubber phase as superstrate to produce a stable inversion of rubber particles having an optimum smaller size to insure high gloss yet maintain toughness. The temperature of mass polymerization is maintained in the range of about 95° to 125° C., preferably about 100° to 115° C., to insure a high molecular weight rigid phase polymer of monovinylidene aromatic monomers and a high molecular weight graft phase on the rubber to insure a stable dispersion of the grafted rubber particles. The amount of catalyst used in the mass-poly step can range from about 0.01 percent to 0.20 percent by weight of the polymerizing mixture, preferably from about 0.02 to 0.10 percent by weight. The mass-polymerization step can range from 120 to 240 minutes depending on the amount of catalyst used.

After the phase inversion of the rubber phase and the rubber particles have been stabilized in the mass polymerization step during 10 to 50 percent conversion, preferably 15 to 35 percent, then larger amounts of catalyst are added to the suspension polymerization step to insure conversion of the remaining monomers. The catalyst can be added to the partially polymerized mixture before suspension or after suspension to catalyze the suspension-polymerization step. The amounts of catalyst for the suspension step can range from 0.15 to 0.30 percent by weight of the partially polymerized mixture, preferably 0.18 to 0.22 percent by weight. The temperature of the suspension-polymerization step can range from about 110° to 150° C., preferably from about 130° to 140° C. The time-cycle of polymerization can range from about 150 to 210 minutes depending on the amount of catalyst used.

It is critical that the time-temperature cycle be long enough and high enough respectively so that when the late conversion of the monomer from 80 to 100 percent is carried out then the catalyst has decomposed and crosslinking of the rubber particles is not further catalyzed.

It has been found that operating at 115° to 150° C., in the suspension polymerization step gives a matrix phase polymer ranging in molecular weight from about 180,000 to about 320,000 (weight average) which optimizes impact strength, modulus and melt flow and also insures that within the time cycle the catalyst has been decomposed and will not crosslink the rubber in the final stages of conversion.

The half life of the catalyst is critical in the mass-polymerization step and a half life of less than 1 hour at 130° C., is used consistent with a second requirement that the catalyst have a 10 hour half-life at temperatures of 95° to 115° C. Catalysts that are too active at low temperatures, e.g., peroxides such as lauroyl, benzoyl, cyclohexanone, etc., having 10 hour half-life below 95° C., are not used in that temperature control in the mass-polymerization step is difficult and control of the polymerization can be lost. Hence, catalyst of the present invention having the desired time-temperature and half-life properties to provide optimum polymerization and grafting rates for the polyblend process consistent with improved commercial time-temperature cycles are used.

High temperature catalysts such as di-t-butyl peroxide having a 10 hour half-life at 126° C. and a half-life of 6.4 hours at 130° C., require that the polymerization be run at higher temperatures (155° to 165° C.) to insure the decomposition of the catalyst. Such catalysts and time-temperature cycles lower the molecular weight of the rigid phase and cause cross-linking of the rubber phase.

The present invention has a catalyst system and time-temperature cycle that can carry the monomer conversion to 99.8 percent and higher giving low residual monomer in the polyblend, less than 0.2 percent, yet unexpectedly preserves the efficiency of the rubber phase and the toughness of the polyblend. The mechanism is not completely understood in that prior art processes that are forced to high conversions, e.g., over 80 percent have caused the rubber phase to crosslink excessively giving the rubber a low swelling index and the polyblend low toughness.

PEROXIDE CATALYSTS

Free radical generating catalysts of a particular organic peroxide type are used in the polymerization steps of the improved mass/suspension polymerization process. It is critical that the catalyst have a half-life less than one hour at 30° C., consistent with a 10 hour half-life at temperatures of 95° to 115° C. (All half-life determinations are made in benzene at concentrations of 0.1 to 0.2 M). The Modern Plastic Encyclopedia for 1972–1973, Vol. 49, McGraw-Hill Company, New York, N.Y., pages 459–462, provides a listing and description of commercial available peroxides according to their half-life properties. The above critical limitations on the catalyst are understood by those skilled in the art and catalysts having such limitations can be prepared or procured commercially. In accordance with the process of the present invention, the residual monomer content of the polyblend can be reduced to less than 0.2 percent by weight and the toughness and elongation at fail improved by the use of a particular class of catalysts and time-temperature cycles in the polymerizatin steps of the invention in comparison with other prior art catalysts or catalyst combinations or systems as heretofore known and as will be illustrated in the examples to follow.

Exemplary of such peroxides are the peroxyesters, e.g., t-butyl peracetate, t-butyl perbenzoate, t-butyl percrotonate, 2,5 dimethyl-2,5-bis (benzoyl peroxy) hexane, aryl substituted t-butyl perbenzoates, e.g., t-butyl peroxy 2-methyl benzoate; alkyl peroxides, e.g., dicumyl peroxide, di-t-butyl peroxy 3,3,5 trimethyl cyclohexane; peroxy carbonates, e.g., t-butyl peroxy isopropyl carbonate, etc.

POLYMERIZATION PROCESS

Based upon the combined weights of polymerizable monomer formulation and the rubber substrate, the amount of rubber employed will generally range between about 2 and 20 percent, the quantity of monomers correspondingly ranging between about 98 and 80 percent. In the preferred polymerization mixtures, the foregoing amounts will range between about 5 and 15 percent and 95 and 85 percent, respectively.

Although the amount of polymeric superstrate grafted onto the rubber substrate may vary from as little as 10.0 parts by weight to 100.0 parts of substrate to as much as 250.0 per 100.0 parts and even higher, the preferred graft copolymers will generally have a superstrate to substrate ratio of about 50 to 200:100 and most desirably about 70 to 150:100. With graft ratios above 50:100, a highly desirable degree of improvement in various properties generally is obtained.

The rubbery polymer or substrate is dissolved in the polymerizable formulation which will consist of monomers, catalyst and other optional components. This polymerization mixture is then polymerized en masse by heating at a temperature of about 95° to 125° C. over a period of about 1 to 4 hours and at a pressure of 1 to 100 pounds per square inch until a portion of the monomer has been polymerized at least sufficient to produce phase inversion, generally about 10.0 to 45.0% by weight thereof, with conventional stirring to aid heat transfer during reaction. The time for this partial polymerization will vary depending upon the catalyst, amount of catalyst, pressures and temperatures employed and the particular monomers and ratios thereof. Generally, it is preferred to conduct such a prepolymerization process to convert approximately 20.0 to 35.0 percent by weight of the monomer.

Those skilled in the art are aware that if one dissolves a diene rubber in the described monomers, that during polymerization the rubber forms a separate rubber-monomer phase with the monomer and the polymer polymerized forms a polymer-monomer phase with the monomer. When the polymer-monomer phase becomes larger during polymerization then the rubber-monomer phase, inverts and disperses as rubber-monomer droplets in the polymer-monomer phase. As the polymerizing mixture is completely polymerized, either by mass or suspension polymerization, e.g., the rubber-monomer droplets polymerize to discrete rubber particles dispersed in the polymer phase forming a polyblend of grafted rubber particles in the polymer phase. The rubber particles are found to be grafted with polymer molecules and also contain occluded polymer of the described monomers.

It has been found possible to analyze the amount of total occluded polymer phase and grafted polymers. The final polymerized polyblend produce (1 gram) are dispersed in a 50/50 dimethyl formamide methyl ethyl ketone solvent (10 ml.) which dissolves the polymer phase matrix leaving the rubber phase dispersed. The rubber phase is separated from the dispersion by centrifuge as a gel and dried in a vacuum oven at 50° C., for 12 hours and weighed as a dry gel.

$$\frac{\text{\% Dry gel}}{\text{in Polyblend}} = \frac{\text{Weight of dry gel}}{\text{Weight of polyblend}} \times 100$$

$$\left.\begin{array}{l}\text{\% Graft and}\\ \text{Occlusions}\\ \text{in Rubber}\end{array}\right\} = \frac{\text{\% dry gel} - \text{\% rubber}}{\text{Percent rubber*}} \times 100$$

*Percent rubber determined by iodine monochloride analysis of the dry gel $$\left.\begin{array}{l}\text{Parts** by weight}\\ \text{of graft polymer}\\ \text{and occluded}\\ \text{polymer per unit}\\ \text{weight of rubber}\end{array}\right\} = \frac{\text{\% dry gel} - \text{\% rubber}}{\text{Percent rubber}}$$

**The present invention preferably has present about 0.5 to 3.5 grams of occluded and grafted polymer per gram of diene rubber particle.

The amount of grafted and occluded polymer contained in the rubber particle can vary being present in said grafted diene rubber in an amount of from about 0.5 to 3.5 parts for each part of rubber, preferably from about 1.5 to 2.5 parts for each part of rubber.

The syrup provided by the partially polymerized formulation is admixed with water in the presence of a suspending agent such as the acrylic acid-acrylate interpolymers of U.S. Pat. No. 2,945,013 granted July 12, 1960 and U.S. Pat. No. 3,051,682 granted Aug. 28, 1962. Secondary dispersing aids may also be added to obtain the desired suspension of the syrup in water. The suspending agent is desirably added to the water, although it may be added to the monomers ab initio or during initial polymerization. This suspension is subjected to agitation and heated at a temperature of about 100°–150° C. for a period of 2 to 4 hours to obtain essentially complete polymerization of the monomers therein. Preferably, such further polymerization is carried out at a temperature of about 115°–140° C. for a period of 2 to 3 hours, depending upon the catalyst and the amount thereof employed. After completion of the reaction, the polymer beads are recovered by centrifuging, washed and dried.

POLYMERIZABLE MONOMER FORMULATION

In addition to the monomers to be polymerized, the formulation can contain desirable components such as stabilizers, molecular weight regulators, etc. The polymerizable monomer formulation comprised of one or more monovinylidene aromatic hydrocarbon monomers, may, in addition, include minor amounts, i.e., up to 20 percent, of a monomer copolymerizable therewith. The preferred compositions are those in which the polymerizable monomer formulation comprises monovinylidene aromatic hydrocarbons and most desirably styrene, although minor amounts of less than about 5 percent by weight of the copolymerizable monomers may be included to some advantage for particular compositions.

Exemplary of the monovinylidene aromatic monomers are styrene; alpha-alkyl monovinylidene monoaromatic compounds, e.g., alpha-methylstyrene, alpha-ethylstyrene, alpha-methylvinyltoluene, alpha-methyl dialkylstyrenes, etc.; ring-substituted alkyl styrenes, e.g., vinyl toluene, o-ethylstyrene, p-ethylstyrene, 2,4-dimethylstyrene, etc.; ring-substituted halostyrenes, e.g., o-chlorostyrene, p-chlorostyrene, o-bromostyrene, 2,4-dichlorostyrene, etc.; ring-alkyl, ring-halo-substituted styrenes, e.g., 2-chloro-4-methylstyrene, 2,6-dichloro-4-methylstyrene, etc.; vinyl naphthalene; vinyl anthracene, etc. The alkyl substituents generally have one to four carbon atoms and may include isopropyl and isobutyl groups. If so desired, mixtures of such monovinylidene aromatic monomers can be employed.

Exemplary of the monomers that can be employed or interpolymerized with monovinylidene aromatic monomers are alpha- or beta-unsaturated monobasic acids and derivatives thereof, e.g., acrylic acid, methyl acrylate, ethyl acrylate, butyl acrylate, 2,ethylhexyl acrylate, long chain ($C_{12-18}$) fatty acid acrylates, methacrylic acid and the corresponding esters thereof, e.g., methyl methacrylate, stearyl methacrylate; acrylamide, methacrylamide; vinyl esters; dialkyl maleates or fumarates such as dimethyl maleate, diethyl maleate, dibutyl maleate, the corresponding fumarates, etc., alkenyl nitrile monomers, e.g., acrylonitrile, methacrylonitrile, etc. The preferred polymerizable monomer formulations contain at least 10.0 percent by weight of monovinylidene aromatic monomer and preferably at least 50.0 percent by weight thereof.

As is well known, it is often desirable to incorporate molecular weight regulators such as mercaptans, halides and terpenes in relatively small percentages by weight, on the order of 0.001 to 1.0 percent by weight of the polymerizable material. In addition, it may be desirable to include relatively small amounts of antioxidants or stabilizers such as the conventional alkylated phenols, although these may be added during or after polymerization. The formulation may also contain other additives such as plasticizers, lubricants, colorants and non-reactive preformed polymeric materials which are suitable or dispersible therein.

THE RUBBER SUBSTRATE

Exemplary of the various rubbers onto which the polymerizable monomer formulation can be grafted during polymerization in the presence thereof to produce the graft copolymers are diene rubbers, natural rubbers, ethylene-propylene terpolymer rubbers, acrylate rubbers, polyisoprene rubbers, and mixtures thereof, as well as interpolymers thereof with each other or other copolymerizable monomers.

The preferred substrates, however, are diene rubbers (including mixtures of diene rubbers), i.e., any rubbery homopolymer (a polymer having a second order transition temperature not higher than 0° C., preferably not higher than −20° C., as determined by ASTM Test D-746-52T) of one or more of the conjugated, 1,3-dienes, e.g., butadiene, isoprene, piperylene, chloroprene, etc. Such rubbers include copolymers of conjugated 1,3-dienes with up to an equal amount by weight of one or more copolymerizable monoethylenically unsaturated monomers, such as monovinylidene aromatic hydrocarbons (e.g., styrene; an aralkyl-styrene, such as theo-, m- and p-methylstyrenes, 2,4-dimethylstyrene, the ar-ethylstyrenes, p-tert-butylstyrene, etc.;

an alpha-methylstyrene, alphaethylstyrene, alpha-methyl-p-methylstyrene, etc.; vinyl naphthalene, etc.); arhalo monovinylidene aromatic hydrocarbons (e.g., the o-, m- and p-chlorostyrenes, 2,4-dibromostyrene, 2-methyl - 4 - chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butylacrylamide, etc.); unsaturated ketones (e.g., vinyl methyl ketone, methyl isopropenyl ketone, etc.); alpha olefins (e.g., ethylene, propylene, etc.); pyridines; vinyl esters (e.g., vinyl acetate, vinyl stearate, etc.); vinyl and vinylidene halides (e.g., the vinyl and vinylidene chlorides and vinylidene chlorides and bromides, etc.); and the like.

Although the rubber may contain up to about 2.0 percent of a crosslinking agent, based on the weight of the rubber-forming monomer or monomers, crosslinking may present problems in dissolving the rubber in the monomers for the graft polymerization reaction. In addition, excessive crosslinking can result in loss of the rubbery characteristics.

A preferred group of rubbers are those consisting essentially of 75.0 to 100.0 percent by weight of butadiene and/or isoprene and up to 25.0 percent by weight of a monomer selected from the group consisting of monovinylidene aromatic hydrocarbons (e.g., styrene), and unsaturated nitriles (e.g., acrylonitrile), or mixtures thereof. Particularly advantageous substrates are butadiene homopolymer or interpolymer of 90.0 to 95.0 percent by weight butadiene and 5.0 to 10.0 percent by weight of acrylonitrile or styrene.

A most preferred group of rubbers are the stereospecific polybutadiene rubbers formed by the polymerization of 1,3 butadiene. These rubbers have a cis-isomer content of about 30–98% and a trans-isomer content of about 70–2% and generally contain at least about 85% of polybutadiene formed by 1,4 addition with no more than about 15 percent by 1,2 addition. Mooney viscosities of the rubber (ML-4, 100° C.) can range from about 20 to 70 with a second order transition temperature of from about −50° to 110° C., as determined by ASTM Test D-746-52T.

Polyblends having diene rubbers grafted with monovinylidene aromatic monomers can be prepared by mass-suspension polymerization methods as disclosed in U.S. Pat. No. 3,488,743. The weight average particle size of the dispersed rubber particle can range from 0.1 to 7.0 microns, preferably 1.0 to 3.0 microns. The weight particle size is measured with a photosedimentometer by the published procedure of Graves, M. J., et. al., "Size Analysis of Subsieve Powders Using a Centrifugal Photosedimentometer," British Chemical Engineering 9:742–744 (1964). A Model 3000 Particle Size Analyzer from Martin Sweets Company, 3131 West Market St., Louisville, Ky. was used. The rubber is grafted with the monomers described and the grafted polymer preferably has the same monomer composition as the polymer into which the grafted rubber is dispersed.

The swelling index of the rubber phase particles is important to the final properties of the HIPS polyblend. A low swelling index of less than 9 indicates that the rubber phase has been crosslinked excessively by the monomer as it polymerizes to a polymer phase in the rubber monomer particles during step (d), in particular, when conversion of the monomer has reached greater than about 80%. Generally, the conversion of monomer to polymer in the occlusions follows the rate of conversion of monomer to polymer in the monomer-polymer phase being carried out in steps (b) and (d). It is at conversions of over about 80 percent that the polystyrene chains are less mobile and less monomer is available for chain propagation that the growing chain radical chain transfers to the rubber molecules and crosslinks them. As heretofore disclosed the catalyst system and the time-temperature cycles of the present invention as used in steps (b) and (d) provides the half-life properties to insure that catalyst activity in the final stages of polymerization is minimized and that excessive crosslinking of the rubber phase is not realized. The present process provides a step (d) that produces a grafted rubber phase having a swelling index preferably of from about 9 to 25 and most preferably from about 9 to 20.

The swelling index of the rubber phase is determined by dispersing the dry gel from the gel test in toluene for 12 hours. The swollen gel is centrifuged and the toluene drained free. The wet gel is weighed.

$$\text{Swelling Index} = \frac{\text{weight of wet gel}}{\text{weight of dry gel}}$$

It has been unexpectedly discovered that if the aforementioned catalyst system is used in combination with a long chain saturated acid and a compound selected from the group consisting of water and hydrated salts or mixtures thereof that the rates of polymerization during the mass polymerization step in particular are highly accelerated. The mechanism is not understood, however, long chain saturated acids in the presence of water or the water of hydration from hydrated salts greatly increase the polymerization rates of the catalyzed monomer-rubber solutions polymerized in the mass polymerization step (b) and (d) without upsetting the kinetics necessary to polymerize the monomers to the desired molecular weight and to obtain the desired degree of grafting of the rubber phase while forcing the polymerization to high conversion to realize a low residual monomer content in the final polyblend. The long chain saturated acids found to accelerate the polymerization rates of the present process are those containing 10 to 20 carbon atoms. Among such acids are lauric, tridecanoic, myristic, penta-dicanoic, palmitic, stearic, monacecanoic and arachidic acids. All of these acids accelerate the polymerization rate from 20 to 100 percent when used in combination with water either as free water or water provided by dehydration of a hydrated salt. Said saturated aliphatic acid is added in steps (a) or (b) in amounts of about 0.050 to 1.0 percent by weight based on monomers, preferably in amounts of from about 0.10 to 0.5 percent by weight.

The water component of the combination is added during step (a) or (b) preferably in step (a) as sparged steam to aid in the dissolving of the rubber but must be critically present in step polymerization (b) during polymerization. Amounts of from about 0.1 to 10.0 percent by weight based on monomer are used. Larger amounts of water are added to the process in step (c) as a suspension medium and are critically present during suspension polymerization in polymerization step (d). Water in amounts of from about 80 to 150 percent by weight based on monomer are added to provide the suspension medium along with suspending agent heretofore disclosed.

The hydrated salt is added in step (a) preferably and is carried forward, being critically present in polymerization step (b). Amounts of from about 0.01 to 1.0 percent by weight based on monomer are added in step (a) carrying forward and being critically present in polymerization step (b). A second add is made in step (c) carrying forward and being critically present in polymerization step (d). The second add is made in amounts of from about 0.10 to 1.0 percent by weight based on monomer. The hydrated salt preferred are those having 3 to 10 molecules of water of hydration that are water soluble and lose their water of hydration at temperatures below about 125° C., making their water of hydration available to the saturated acids at polymerization temperatures of 95° to 125° C. Among such hydrated salts are $MgSO_4.7H_2O$, $Na_2CO_3.10H_2O$, $Na_2SO_4.10H_2O$ and $Na_3PO_4.12\ H_2O$ or mixtures thereof.

It is obvious that many variations can be made in the process set forth above and in the following examples without departing from the spirit and scope of the invention.

EXAMPLE 1

CONTROL

A polymerization mixture comprising about 13 weight percent of butadiene rubber having a cis 1,4 content of about 35 weight percent and a Mooney viscosity of 55 dissolved in about 87 percent of styrene monomer is charged to a suitable reaction vessel. After adding about 0.1 weight percent of t-butyl perbenzoate catalyst and about 0.06 weight percent of a tert-dodecyl mercaptan chain transfer agent based on the polymerization mixture, the reaction vessel is purged of oxygen by a stream of nitrogen and the polymerization mixture stirred and heated under reflux conditions at 105° C., for 195 minutes to effect heat transfer and polymerize about 30 percent of the styrene monomer.

The resulting partially polymerized syrup is then suspended in heated water having suitable suspending agents dispersed therein. The suspension is thereafter heated to 160° C., and stirred to effect heat transfer and maintain the suspension for 195 minutes sufficient to effect essentially complete conversion of the monomer to polymer. Finally the suspension is cooled, centrifuged, washed and dried to recover the polyblend particles as beads.

The suspension polymerization is run with a water to partially polymerized mixture ratio of about 1:1. This ratio can be varied from 2:1 to 4,5, however, about 1:1 is preferred. An antioxidant (trisnonylphenyl phosphate 0.15 weight percent) is used in the mass-poly step. The suspending agent is a 95.5 mol percent acrylic acid and 4.5 mol percent 2-ethylhexyl acrylate polymer having a specific viscosity of 4.0 as determined in a 1 percent solution in water and described in U.S. Pat. No. 3,051,682. The suspending agent is used in amounts of about 0.18 weight percent based on the water.

The polyblend beads containing about 13 weight percent of polybutadiene rubber were blended with polystyrene homopolymer to provide a polyblend having about 5.5 weight percent rubber and molded into test bars for impact strength tests according to ASTM Test D-256-56 and specimens for testing physical properties.

EXAMPLES 2 – 25

Example 1 was repeated with the addition of varying amounts of saturated aliphatic acids, hydrated salts and water in step (b) or the mass polymerization step to demonstrate the accelerated polymerization rates obtained with the improved process. Samples were analyzed at the end of step (b) or mass polymerization step to determine the percent conversion versus time as a measure of the accelerated polymerization obtained in step (b). The formulations and data are shown in Table I.

TABLE I

| Example | Catalyst *Weight % | Acid *Weight % | Water *Weight % | Salt *Weight % | Temp. ° C. | Prepoly Conv. % | Prepoly Time Minutes | Suspension Time Minutes |
|---|---|---|---|---|---|---|---|---|
| 1 | .051[1] | — | — | — | 105 | 22.8 | 195 | 195 |
| 2 | .051[1] | — | — | — | 105 | 20.0 | 195 | 200 |
| 3 | .051[1] | .130[2] | 1.7 | .02[3] | 105 | 27.8 | 135 | 173 |
| 4 | .051[1] | .130[2] | 1.7 | .02[3] | 105 | 28.5 | 135 | 170 |
| 5 | .051[1] | .130[2] | 1.7 | — | 105 | 26.0 | 150 | 175 |
| 6 | .051[1] | .130[2] | — | .02[3] | 105 | 27.9 | 150 | 175 |
| 7 | .044[1] | — | — | — | 105 | 22.4 | 240 | 195 |
| 8 | .044[1] | — | 1.7 | .02[3] | 105 | 21.5 | 240 | 205 |
| 9 | .044[1] | .130[2] | 1.7 | — | 105 | 20.0 | 210 | 210 |
| 10 | .044[1] | .130[2] | — | .02[3] | 105 | 22.4 | 210 | 198 |
| 11 | .10[1] | .130[2] | 1.7 | .02[3] | 99 | 27.0 | 120 | 175 |
| 12 | .10[1] | — | — | — | 99 | 22.0 | 200 | 200 |
| 13 | .030[4] | — | — | — | 105 | 23.0 | 195 | 195 |
| 14 | .030[4] | .130[2] | 1.7 | .02[3] | 105 | 29.0 | 130 | 165 |
| 15 | .051[1] | .05[2] | 1.7 | .02[3] | 105 | 25.6 | 140 | 175 |
| 16 | .051[1] | .50[2] | 1.7 | .02[3] | 105 | 28.0 | 135 | 170 |
| 17 | .051[1] | .130[2] | 3.4 | .02[3] | 105 | 28.2 | 130 | 170 |
| 18 | .051[1] | .130[2] | — | .20[3] | 105 | 28.0 | 150 | 170 |
| 19 | .051[1] | .130[2] | — | .55[3] | 105 | 27.9 | 150 | 170 |
| 20 | .051[1] | .130[5] | 1.7 | .02[3] | 105 | 27.2 | 140 | 170 |
| 21 | .051[1] | .130[2] | 1.7 | .02[6] | 105 | 28.3 | 140 | 170 |
| 22 | .051[1] | .130[2] | 0.5 | .02[3] | 105 | 27.9 | 135 | 170 |
| 23 | .051[1] | .130[2] | 0.2 | .02[3] | 105 | 28.1 | 145 | 170 |
| 24 | .030[1] | .130[2] | 1.7 | .02 | 115 | 26.0 | 140 | 175 |

TABLE I-continued

| Example | Catalyst *Weight % | Acid *Weight % | Water *Weight % | Salt *Weight % | Temp. °C. | Prepoly Conv. % | Prepoly Time Minutes | Suspension Time Minutes |
|---|---|---|---|---|---|---|---|---|
| 25 | .030[1] | — | — | — | 115 | 22.9 | 200 | 200 |

*Weight % based on monomer
[1]t-butyl perbenzoate
[2]stearic acid
[3]MgSO$_4$.7H$_2$O
[4]t-butyl peracetate
[5]palmitic acid
[6]Na$_2$SO$_4$.10H$_2$O It is evident from Table I, Examples 1–4, that the polymerization rate is increased substantially with the use of the improved process using a particular catalyst system in combination with a saturated aliphatic acid, water and a hydrated salt in particular t-butyl perbenzoate, stearic acid, water and MgSO$_4$.7H$_2$O. Examples 3–4 require only 135 minutes compared to 195 minutes for the control, reaching higher conversions in the reduced time. At comparable conversions the time would be on the order of 100 minutes or about a 50 percent reduction in time needed to polymerize increasing the rate about 100 percent providing great utility for the improved process. Examples 5–6 show that the acid in combination with free water or water of hydration can provide the accelerated rates provided by the process. Examples 7–12 show the effective range of the catalysts operating in combination with free water or water of hydration. Examples 13–14 show the effective catalysis provided by t-butyl peracetate, a catalyst of the class disclosed providing accelerated rates of polymerization. Examples 15–16 show the effectiveness of the acid within the range of acid operable in the process. Examples 17, 22–23 show that the water can be varied over a wide range consistent with ranges of operability. Examples 18–19 show the effectiveness of the hydrated salts over a range of concentrations. Example 20 shows the effectiveness of palmitic acid, a long chain saturated acid of the class disclosed providing accelerated polymerization. Example 21 shows the effectiveness of Na$_2$SO$_4$.10H$_2$O as a salt of the class disclosed. Examples 24–25 show a lower range of catalyst used at higher temperature consistent with polymerization rates experienced with higher temperatures in step (b).

Suspension Polymerization

The mass polymerized syrups obtained in Examples 2–25 were suspended as in Example 1 using added amounts of catalyst and hydrated salts to finish the polymerization in suspension. The saturated acids carried through in the syrup and the additional catalysts were used to insure complete conversion. The hydrated salts were used in additional quantities to buffer the final suspension insuring increased rates and a stable suspension. The prepoly runs 2–25 were finished in suspension at 140° C., using about 0.22 percent by weight of additional tertiary butyl perbenzoate based on said monomers and about 0.25 percent by weight of MgSO$_4$.7H$_2$O based on said monomers. The conversions were all run to the range of 99.9±0.05 percent with the time needed to reach essentially complete conversion shown in Table I. The finished polymers were tested as in Example 1 with resins prepared by the present process having high impact strength, low residual monomer providing polyblends of high utility.

EXAMPLE 26

Example 20 was repeated using 0.15 weight percent of t-butyl peracetate in the suspension cycle and the time cycle for polymerization was found to be about 160 minutes consistent with a catalyst of the disclosed class.

EXAMPLE 27

Example 21 was repeated using 0.25 percent by weight of Na$_2$SO$_4$.10H$_2$O in the suspension cycle and the time cycle for polymerization was found to be about 170 minutes consistent with hydrated salts of the disclosed class.

What is claimed is:

1. In a polymerization process for preparing polyblends having the following steps of (a) dissolving a graftable rubbery polymer in a polymerizable monomer formulation comprising at least one monovinylidene aromatic monomer to form a polymerizable mixture, (b) mass polymerizing with agitation said mixture to a partially polymerized mixture having a grafted, inverted and dispersed rubber phase, (c) suspending said partially polymerized mixture in an inert liquid, (d) suspension polymerizing said partially polymerized mixture to higher conversions and (e) recovering the suspending polyblend from said suspension, the improvement which comprises utilizing a peroxide catalyst having a half life of less than one hour at a temperature of 130° C., and a 10 hour half life at a temperature of 95° to 115° C., in combination with a saturated aliphatic acid containing 12 to 20 carbon atoms and a hydrated salt in steps (b) and (d) wherein step (b) is carried out at a temperature of from 95° to 125° C., polymerizing said polymerizable mixture to a conversion of about 10 to 45 percent and step (d) at a temperaure of from 110° to 150° C., polymerizing said partially polymerized mixture to essentially complete conversion and wherein said hydrated salt is present in step (b) in an amount of from about 0.01 to 1.0 percent by weight based on said monomers and in step (d) from about 0.10 to 1.0 percent by weight based on said monomers.

2. In a polymerization process for preparing polyblends having the following steps of (a) dissolving a graftable rubbery polymer in a polymerizable monomer formulation comprising at least one monovinylidene aromatic monomer to form a polymerizable mixture, (b) mass polymerizing with agitation said mixture to a partially polymerized mixture having a grafted, inverted and dispersed rubber phase, (c) suspending said partially polymerized mixture in an inert liquid, (d) suspension polymerizing said partially polymerized mixture to higher conversions and (e) recovering the suspending polyblend from said suspension, the improvement which comprises utilizing in combination t-butyl perbenzoate, stearic acid and MgSO$_4$.7H$_2$O in steps (b) and (d) wherein step (b) is carried out at a temperature of from 95° to 125° C., polymerizing said polymerizable mixture to a conversion of about 10 to 45 percent and step (d) at a temperature of from 110° to 150° C., polymerizing said partially polymerized mixture to essentially complete conversion.

* * * * *